United States Patent
Patire et al.

(10) Patent No.: US 6,812,783 B2
(45) Date of Patent: Nov. 2, 2004

(54) DISCRITIZED PHASE CONSTELLATION CONTINUOUS PHASE MODULATION DEMODULATOR

(75) Inventors: Anthony D. Patire, Hiroshima (JP); Andy Chan, Redondo Beach, CA (US); Ronald P. Smith, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 152 days.

(21) Appl. No.: 09/944,982

(22) Filed: Aug. 31, 2001

(65) Prior Publication Data

US 2003/0042974 A1 Mar. 6, 2003

(51) Int. Cl.[7] .................................. H03D 3/00
(52) U.S. Cl. ........................ 329/300; 329/304
(58) Field of Search ...................... 329/300, 301, 329/302, 304, 303, 110, 122, 107; 341/50–110; 375/223, 224, 340

(56) References Cited

U.S. PATENT DOCUMENTS

| | | | | |
|---|---|---|---|---|
| 4,583,048 A | * | 4/1986 | Gumacos et al. | 329/302 |
| 4,631,489 A | * | 12/1986 | Laird et al. | 329/320 |
| 4,968,985 A | * | 11/1990 | Riggle et al. | 341/106 |
| 5,272,446 A | * | 12/1993 | Chalmers et al. | 329/304 |
| 5,394,109 A | * | 2/1995 | Simard | 329/300 |
| 5,719,867 A | * | 2/1998 | Borazjani | 370/436 |
| 5,790,606 A | * | 8/1998 | Dent | 375/348 |
| 5,828,698 A | * | 10/1998 | Kim | 375/223 |
| 5,898,737 A | * | 4/1999 | Chethik et al. | 375/235 |
| 5,963,599 A | * | 10/1999 | Curtis et al. | 375/341 |
| 6,031,418 A | * | 2/2000 | Fowler | 329/341 |

* cited by examiner

Primary Examiner—Michael Tokar
Assistant Examiner—Linh V. Nguyen
(74) Attorney, Agent, or Firm—Tarolli, Sundheim, Covell & Tummino L.L.P.

(57) ABSTRACT

Methods and devices for demodulators for continuous phase modulation waveforms. A modulated sampled signal is received. A consecutive sequence of the modulated sampled signal is buffered. The consecutive sequence is compared with all possible valid modulated sampled signals. A bit decision representing a demodulation of the consecutive sequence of the modulated sampled signal is determined based on a closest valid modulated sampled signal located closest to the consecutive sequence of the modulated sample signal in a constellation.

22 Claims, 4 Drawing Sheets stream of

DISCRITIZED PHASE CONSTELLATION CONTINUOUS PHASE MODULATION DEMODULATOR

BACKGROUND OF THE INVENTION

1. Field of the Invention

This invention relates to demodulators, and more specifically to reduced complexity demodulators for continuous phase modulation waveforms.

2. Background and Material Information

Continuous phase modulation (CPM) techniques modulate the phase of a carrier. This differs from modulation techniques that modulate the amplitude or frequency. Minimum Shift Keying (MSK), and Gaussian Minimum Shift Keying (GMSK), are examples of continuous phase modulation techniques. Other phase modulation techniques include Binary Shift Keying (BPSK) and Quaternary Phase Shift Keying (QPSK). Each of these techniques has its own advantages and drawbacks. For example, both BPSK and QPSK modulations exhibit a power spectral density (PSD) with large side lobes that may cause adjacent channel interference (ACI). The utilization of a filtering process to reduce the sides lobes may introduce interference between the symbols in the same frequency (intersymbol interference (ISI)) and additional system complexity.

Therefore, developers of communication systems have turned to modulation schemes that are already bandwidth efficient as opposed to using filtering to remove side lobes and attain bandwidth efficiency. A more bandwidth efficient modulation, such as MSK, eliminates step changes in the phase of the transmitted waveform and is, therefore, noted as a CPM. Pre-modulation filtering, such as GMSK, will eliminate step changes in the frequency of the transmitted waveform. For GMSK, a controlled amount of ISI is introduced into the waveform and symbols are transmitted as gradual changes in phase. The result is that the GMSK waveform has a power spectral density (PSD) that falls off extremely quickly, therefore, allowing frequency channels to be packed closely together.

GMSK and other CPMs enable the information carrying capacity and bandwidth efficiency of a communication system to be increased. However, one consequence of this waveform is that it requires significant computation to perform the data detection/demodulation. The computation requirement increases the number of gates in logic circuits designed to perform the detection. If the logic circuits are implemented in an application specific integrated circuit (ASIC), the size of the ASIC required to perform the detection is driven by the computation requirements. The number of gates in the ASIC drives the power requirement for the demodulator. Each reduction in complexity of the demodulator not only decreases the cost of the communication system, but also increases the reliability, manufacturability, and maintainability of the communication system.

Conventional methods to perform data detection involve more complicated computational procedures such as the Viterbi algorithm, or some type of matched filtering and Wiener filtering, or other equalization/approximation filters. The implementation of the Viterbi algorithm requires a feedback loop to compare all the possible branch metrics. At a high data rate, the latency in this critical loop becomes a problem. Advanced filtering techniques require multiplication operations, which are relatively expensive to implement in logic gates or ASICs. Therefore, there is a need for a new, computationally efficient data detection approach that may be realized in hardware with a minimal number of gates.

SUMMARY OF THE INVENTION

Accordingly, the present invention is directed to demodulators for continuous phase modulation waveforms that substantially obviate one or more of the problems arising from the limitations and disadvantages of the related art.

The present invention includes a method for demodulating a signal that includes: receiving a modulated sampled signal; buffering a consecutive sequence of the modulated sampled signal; comparing the consecutive sequence with all possible valid modulated sampled signals; and determining a bit decision representing a demodulation of the consecutive sequence of the modulated sampled signal, the determination made based on a valid modulated sampled signal located closest to the consecutive sequence of the modulated sample signal in a constellation.

The modulated sampled signal may be a GMSK signal. The consecutive sequence of the modulated sampled signal may be quantized before the buffering, thereby forming quantized sequential signals. The quantized sequential signals may be used in the comparing. The quantized sequential signals may be concatenated to form a part of an address to a memory. The address and memory may be used in the determining. Bit decisions representing demodulation of all possible consecutive sequences of the modulated sampled signal may be stored in the memory. The address may be used to access the bit decision representing a demodulation of the consecutive sequence of the modulated sampled signal.

Output from a counter may be used as part of the address to the memory. The consecutive sequence of the modulated sampled signal may be consecutive phase locations of the modulated sampled signal. The consecutive phase locations of the modulated sampled signal may be four consecutive phase locations. The comparing may include measuring the distance between the consecutive sequence and each of valid modulated sampled signals. The distance between the consecutive sequence and each valid modulated sampled signal may be measured by the difference between phases of the consecutive sequence and each valid modulated sampled signal. The distance between the consecutive sequence and each valid modulated sampled signals may be measured by the cosine of a phase difference between the consecutive sequence and each valid modulated sampled signal.

The present invention further includes a method for demodulating a modulated signal that may include: receiving at least one modulated input waveform; determining all possible valid modulated waveforms; comparing the received at least one modulated input waveform with the possible valid modulated waveforms; and determining bit decisions representing a demodulation of the at least one modulated input waveform where each bit decision may represent the valid modulated waveform closest to each received at least one modulated input waveform.

The at least one modulated input waveform may be a GMSK waveform. The at least one modulated input waveform may be quantized thereby forming quantized sequential signals. The quantized sequential signals may be concatenated to form a part of an address to a memory. The bit decisions may be stored in the memory. The address may be used to access the bit decisions representing a demodulation of the at least one modulated input waveform.

The present invention also includes a demodulator that may include a quantizer where the quantizer receives an input modulated waveform. The quantizer may quantize the input modulated waveform producing quantized data. The demodulator may also include a t least one memory device operatively connected to the quantizer where the at least one memory device contains bit decisions representing a demodulation of the input modulated waveform. The quantized data may be used to form an address to the at least one memory.

The demodulator may include at least one buffer where the at least one buffer is operatively connected between the quantizer and the at least one memory device. The at least one buffer may form a memory address using the quantized data and send the memory address to the at least one memory device to obtain the bit decisions. The demodulator may include at least one counter operatively connected to the at least one memory device. The output from the at least one counter may be used as part of the memory address to access the bit decisions. Each at least one buffer may be a shift register. The at least one memory device may be a ROM or a RAM. The quantizer may be an angle quantizer.

The present invention further includes a method for demodulating a signal that includes: identifying characteristics of a modulated input waveform; determining a finite number of values in a nominal constellation representing all possible valid values for the modulated input waveform; determining an approximate phase constellation of valid values for the modulated input waveform based on a location or groupings of the values for the modulated input waveform in the nominal phase constellation, wherein the number of valid values for the modulated input waveform in the approximate phase constellation may be less than the number of values for the modulated input waveform in the nominal phase constellation; determining all possible values for the modulated input waveform with noise; comparing each possible value for the modulated input waveform with noise with the valid values for the modulated input waveform; assigning a bit decision representing each valid value for the modulated input waveform closest to each possible value for the modulated input waveform with noise for all possible values for the modulated input waveform with noise; storing the bit decisions in a memory device; receiving a set number of consecutive modulated input waveforms with noise; quantizing each received set number of consecutive modulated input waveforms with noise; forming a memory address from bits representing each quantized set number of consecutive modulated input waveforms with noise and output from a counter; and outputting the bit decision representing a demodulation of the set number of consecutive modulated input waveforms, the bit decision is outputted from the memory address of the memory device.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows in reference to the noted plurality of drawings by way of non-limiting examples of preferred embodiments of the present invention in which like reference numerals represent similar parts throughout the several views of the drawings and wherein.

DETAILED DESCRIPTION OF THE PREFERRED EMBODIMENTS

Figure 1:
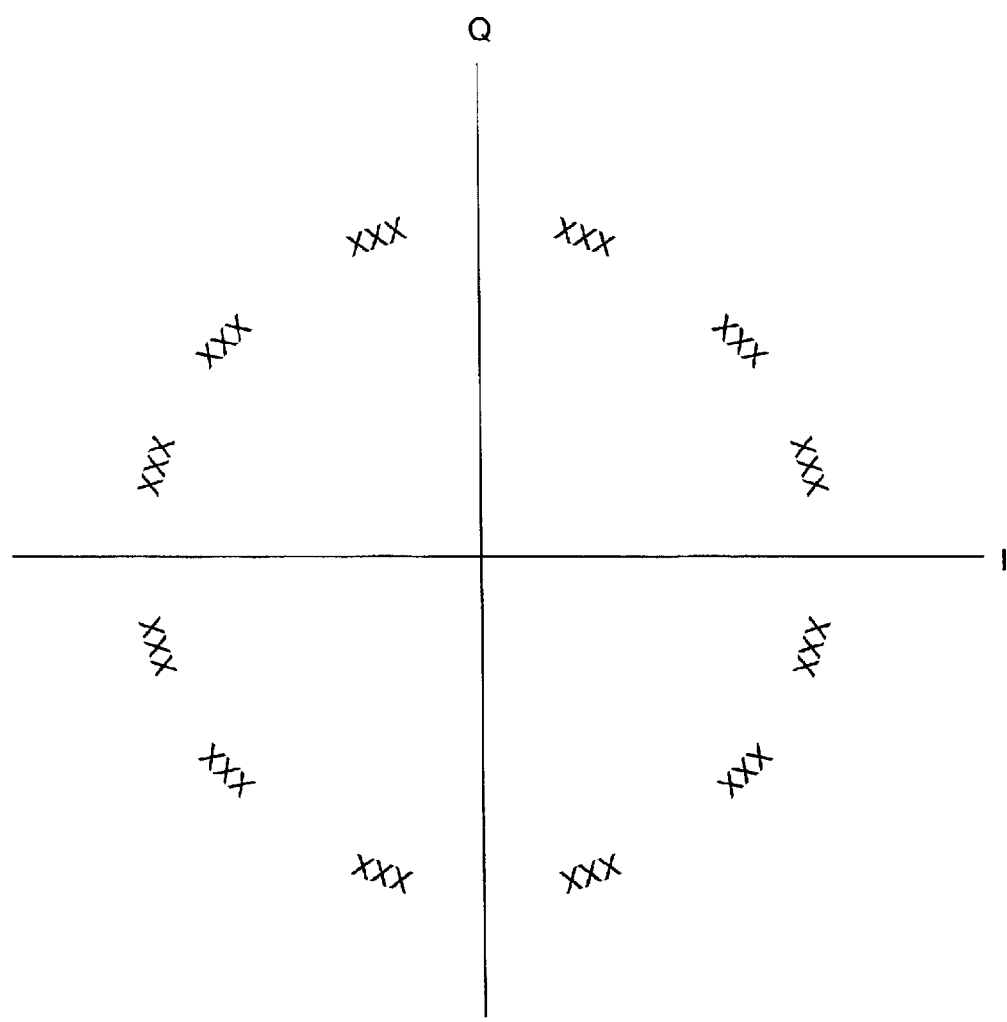
FIG. 1 is a graph of a phase constellation for an example GMSK waveform according to the present invention.

The particulars shown herein are by way of example and for purposes of illustrative discussion of the embodiments of the present invention.

The present invention uses a known finite set of values and/or possibilities for the modulation of a signal to allow demodulation of the modulated signal with noise with a demodulator having reduced complexity and a minimal number of gates. A signal is modulated by any one of many known modulation techniques. Knowing the modulation method, the characteristics of the modulated signal may be determined. Also, a finite set of modulated signal values on a constellation is known for all possible signals undergoing this modulation technique. A demodulator (detector) according to the present invention uses this information, along with the groupings and/or symmetry of the values on the constellation, to determine an approximated reduced finite set of modulated signal values on the constellation. The reduced finite set of modulated signal values may be stored in a memory. A detector according to the present invention may receive a set number of consecutive modulated sampled signals of the entire modulated sampled signal. This may depend on how many chip times it takes to send out one symbol. The set number of consecutive signals received by a detector according to the present invention may be quantized. The quantized signals may be concatenated together to form all or a portion of an address to a memory device. A counter's output may also form a portion of the address to the memory device. A memory device contains bit decisions representing demodulated signals for all possible consecutive modulated sampled signals. The address may be used to access the bit decision stored in the memory that represents the demodulated consecutive signals. This process is repeated by receiving another group of consecutive modulated sampled signals of the entire modulated sampled signal, and then another group until the entire modulated sampled signal has been demodulated.

To illustrate a demodulator/detector according to the present invention, an example embodiment is described where the modulated sampled signal is a GMSK waveform. This type of waveform represents one of many phase modulation techniques. However, demodulators and demodulation methods according to the present invention may be used for a signal modulated by any phase modulation technique, or any other modulation technique, e.g. amplitude, frequency, or hybrid modulation techniques. Therefore, application of demodulators and/or modulation methods according to the present invention to any type of modulated signal would still be within the spirit and scope of the present invention.

For any CPM waveform sampled at a multiple of the symbol rate, there exists only a finite number of values that the phase of the CPM waveform may take. Therefore, there is a finite phase constellation (nominal phase constellation (NPC)). In other words, there is a finite set of possible phase points in a phase constellation for the sampled CPM waveform. From the NPC, the distribution and/or grouping of possible phase points may be used to further define a simpler approximate phase constellation (APC) that contains fewer phase points than the NPC.

An exemplary embodiment of a CPM waveform that is a binary GMSK BT=⅙ waveform, with frequency deviation function truncated to L=6 symbol intervals, and a modulation index of BT=½ (B is bandwidth and T is the chip time (transition time for individual bits)) will be used to illustrate the present invention. For this GMSK signal, the phase of the carrier may transition 90 degrees. The present invention is not limited to GMSK modulated waveforms, and may be used for any modulation type. A GMSK waveform with L=6 has, in general, $2^L$ possible phase points in a complete nominal phase constellation generated by sampling the GMSK waveform at one sample per symbol interval. Although there are 64 possible phase points, many of the phase points overlap on top of each other. Thus, for L=6, 28 of the 64 phase points are somewhat redundant and, therefore, modulation may be exactly performed at a rate of one sample per symbol interval using only 36 phase points.

FIG. 1 shows a graph of the resulting constellation for a GMSK waveform sampled at a rate of one sample per symbol, producing resulting values that fall within a 36-point nominal phase constellation within in-phase-quadrature-phase (I-Q) space. The x-axis represents the in-phase component and the y-axis represents the value of the quadrature phase component of the point in the constellation. As shown in FIG. 1, this 36-point phase constellation may be made up of 12 groups with 3 phase points in each group. Each of the 3 phase points in each group may differ by less than 3 degrees from each of the other phase points in the group. Therefore, the phase points in a phase constellation for the GMSK waveform may be approximated by using a phase constellation of 12 points. The GMSK waveform thus represents a modulation of a signal where the modulation results in 12 possible phases (or phase trajectories).

If a window of four consecutive phases were observed from the GMSK modulated waveform, it is apparent that there exists a total of 128 valid phase trajectories in a noiseless system. If there are 12 possible input phases to a demodulator, and 4 consecutive input phases are observed at a time, then taking in consideration the possibility of the modulated input phase passing through a noisy channel, as it travels from the modulator to the demodulator, creating a noisy signal, there exists a total of $12^4$=20736 possible input phase trajectories received at the demodulator input. Therefore, data detection/demodulation may be performed by comparing an input phase trajectory with a stored set of valid phase trajectories, and choosing the bit decision corresponding to the valid phase trajectory located closest to the input phase trajectory on an I-Q phase constellation. Thus, in a demodulation according to the present invention, the demodulation outcomes for all possible input phase trajectories to a demodulator are pre-computed without the need for calculating the metrics on the fly, as is done with prior demodulation methods such as the Viterbi algorithm.

Figure 2:
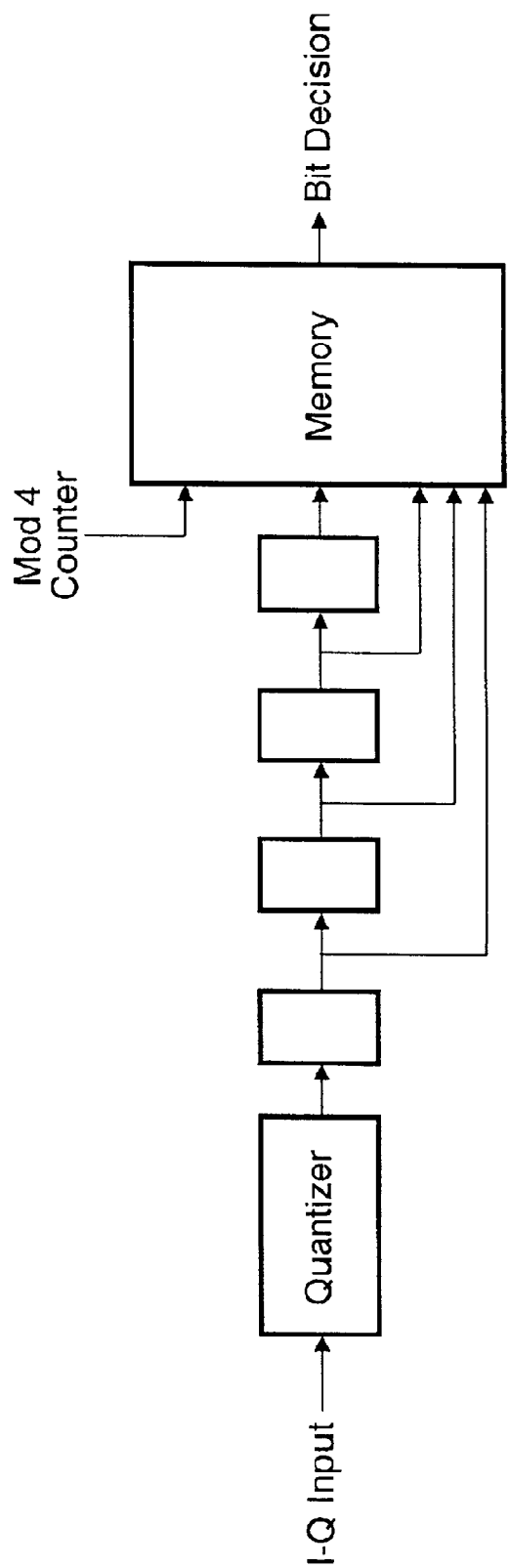
FIG. 2 is a block diagram of an exemplary discritized phase constellation continuous phase modulation waveform demodulator according to the present invention.

FIG. 2 shows a block diagram of an exemplary discritized phase constellation continuous phase modulation waveform demodulator according to the present invention. Modulated sampled I-Q input signals 50 are received by a quantizer 52. In this exemplary embodiment, four consecutive input phases are received at a time. Also, because of the type of modulated signal received in this exemplary embodiment, the quantizer may be an angle quantizer. Further, in this exemplary embodiment, it may take the modulator more than one chip time (bit time) to send out a symbol and, therefore, multiple input phases to the demodulator may be needed to be received to determine which symbol was sent. The I input signal and the Q input signal of the input phase may each be represented by multiple bits. For example, angle quantizer 52 may receive four bits representing the modulated in-phase input signal and four bits representing the modulated quadrature-phase input signal. The number of bits used to represent the modulated input signal received by angle quantizer 52 may depend on the sampling, and may be any number of bits and still be within the spirit and scope of the present invention.

Angle quantizer 52 performs a rectangular to polar conversion where the complex values of the I-Q input signals are converted to phase angles. The number of bits used to represent the phase angles may vary but are all within the spirit and scope of the present invention. Since there are 12 possible phase values that a demodulated signal may be for any input phase trajectory, each of the phases of the received I-Q input signals 50 may be quantized to four bits. The input phase trajectories may be quantized to more than four bits (e.g., six bits) which would provide a higher resolution for detection, however, this may increase the size of a memory device (discussed following) used for storing all valid phase trajectories for all possible I-Q input phase trajectories. In this exemplary embodiment, since each phase may be one of 12 possible phase values, four bits is the lowest number that may be used for quantization of the input phase trajectories.

The data bits representing the phase angle of the input signals are sent to a series of unit delay stages 54. The devices used for these stages may be a variety of electronic components, e.g., registers, buffers, logic gates, etc. In this example embodiment, four consecutive phases are buffered by the unit delay stages 54, therefore, four unit delay stages 54 are shown. There is one set of unit delay stages for each phase angle. The bits representing the four consecutive phase angles may be concatenated to form all or a portion of a memory address. The output of a counter 58 may be used in a portion of the memory address also. Based on the characteristics of this exemplary modulated waveform (i.e., BT=½), a modulo four counter may be used where the output bits of the modulo four counter represent the phase of the carrier transition of 90 degrees. Thus, the two bits from the counter may represent 0, 90, 180 and 270 degree transitions, which may reduce the size of the memory by making it unnecessary to store values for each of the quadrants. If a modulated waveform had a different modulation index, e.g., BT=¼, the symbol transition may be 45 degrees and, therefore, a modulo 8 counter (360/45=8) may be needed. This counter starts counting at receipt of the first I-Q input signal by the detector. It is used to set the initial conditions for the detector and ROM access. Therefore, in this exemplary embodiment a memory address of 18 bits (2 bits from the counter, and 4 bits each from the 4 phases) would be formed and then sent to a memory device 56. In this example embodiment, memory device 56 is a ROM.

In a demodulator according to present invention, ROM 56 has previously been written with data bit decisions representing the demodulated phase trajectories for all possible I-Q input phase trajectories received by the decoder. For every possible input trajectory, a bit decision that represents a demodulated input phase trajectory may be assigned that corresponds to the valid phase trajectory closest to the input phase trajectory in question on a phase constellation. This assignment may be determined by comparing the input phase trajectory to the set of valid phase trajectories. Specifically, the assignment may be determined by calculating the distance between the input phase trajectory and the valid phase trajectories by measuring the difference between the phases of the input phase trajectory and the valid phase trajectories. Alternatively, the distance between the input phase trajectory and the valid phase trajectories may be determined by the cosine of the phase difference between the input phase trajectory and the valid phase trajectories. Any other method may be used to determine the closest valid phase trajectory to the input phase trajectory, and still be within the spirit and scope of the present invention. The resultant assignments, i.e., the valid phase trajectories for every possible input phase trajectory, are stored in ROM 56. Therefore, the bits representing the four consecutive phase angles form at least a portion of an address to ROM 56, thereby causing ROM 56 to output the correct bit decision representing a demodulation of the four consecutive I-Q input signals. The ROM may be clocked at a chip time.

Figure 3:
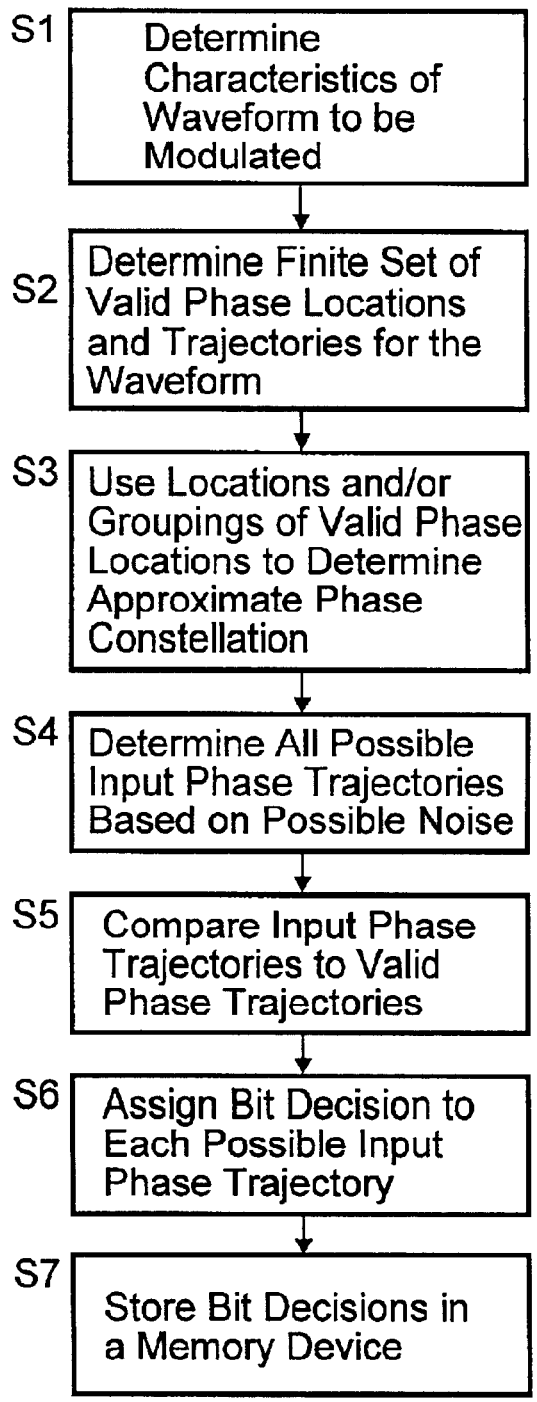
FIG. 3 is a flowchart of an exemplary process for calculating the contents of a memory device in a discritized phase constellation continuous phase modulation waveform demodulator according to the present invention.

FIG. 3 is a flowchart of an exemplary process of calculating the contents of a memory device in a discritized phase constellation continuous phase modulation waveform demodulator according to the present invention. The characteristics of the waveform to be demodulated is determined (S1), e.g., GMSK BT=⅙, modulation index=½. A finite number of valid phase locations that constitute a nominal phase constellation for the waveform is determined. Additionally, a finite number of valid phase trajectories, or possible consecutive sequences of phase locations within the nominal phase constellation, is determined (S2). An approximate phase constellation of valid phase points based on the location and/or groupings of the phase locations in the nominal phase constellation is determined (S3). All possible input phase trajectories are determined based on the possibility of a noisy signal (S4). Each possible input phase trajectory is compared to valid phase trajectories (S5). A bit decision representing the valid phase trajectory closest to each specific possible input phase trajectory is assigned for every possible input phase trajectory (S6). The bit decisions are stored in a memory device (S7).

Figure 4:
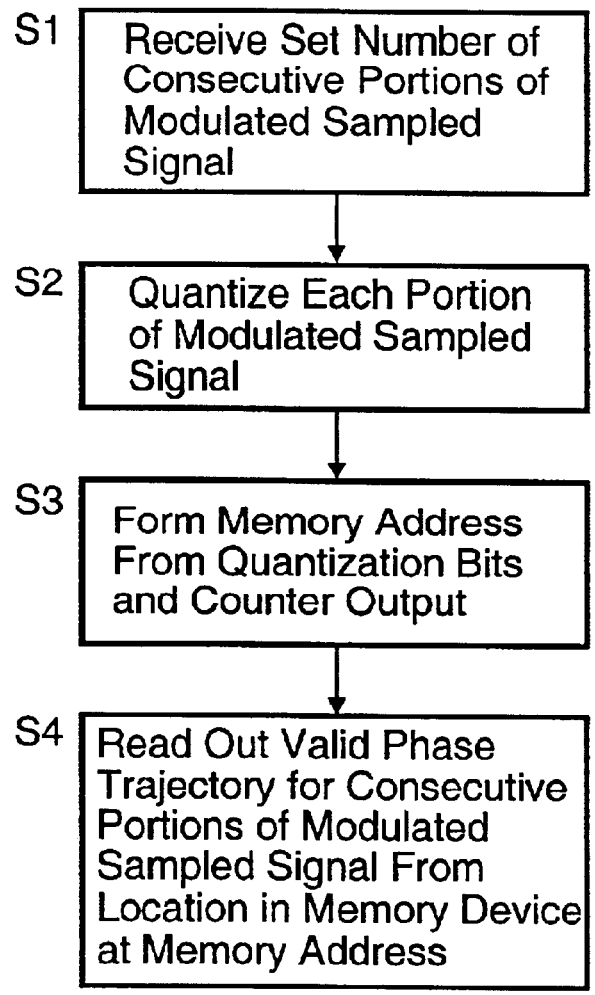
FIG. 4 is a flowchart of an exemplary demodulation process according to a discritized phase constellation continuous phase modulation waveform demodulator according to the present invention.

FIG. 4 is a flowchart of an exemplary demodulation process for the exemplary waveform according to a discritized phase constellation continuous phase modulation waveform demodulator according to the present invention. A set number of consecutive modulated sampled signals are received (S1). Each received consecutive modulated sampled signal is quantized (S2). A memory address is formed using bits representing each quantized consecutive modulated sampled signal and output from a counter (S3). The memory address is applied to a memory device to read out bit decisions representing valid phase trajectories for the consecutive modulated sampled signal where the bit decision represents a demodulation of the consecutive modulated sampled signals (S4). It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed:

1. A method for demodulating a signal comprising:
   receiving a modulated sampled signal;
   buffering a consecutive sequence of the modulated sampled signal;
   comparing the consecutive sequence with all possible valid modulated sampled signals; and
   determining a bit decision representing a demodulation of the consecutive sequence of the modulated sampled signal, the determination made being based on a valid modulated sampled signal located closest to the consecutive sequence of the modulated sampled signal in a constellation.

2. The method according to claim 1, comprising receiving a modulated sampled signal GMSK signal.

3. The method according to claim 1, further comprising quantizing the consecutive sequence of the modulated sampled signal before the buffering, thereby forming quantized sequential signals, the quantized consecutive sequence being used in the comparing.

4. The method according to claim 3, comprising concatenating the quantized sequential signals to form a part of an address to a memory, the address and memory being used in the determining.

5. The method according to claim 4, comprising storing in the memory bit decisions representing demodulation of all possible consecutive sequences of the modulated sampled signal, the address being used to access the bit decision representing a demodulation of the consecutive sequence of the modulated sampled signal.

6. The method according to claim 5, comprising using output from a counter as part of the address to the memory.

7. The method according to claim 1, comprising buffering consecutive phase trajectories of the modulated sampled signal.

8. The method according to claim 7, comprising buffering four consecutive phase trajectories.

9. The method according to claim 1, wherein the comparing comprises measuring a distance between the consecutive sequence and each valid modulated sampled signals.

10. The method according to claim 9, comprising measuring the distance between the consecutive sequence and each valid modulated sampled signals by measuring the difference between phases of the consecutive sequence and each valid modulated sampled signal.

11. The method according to claim 9, comprising measuring the distance between the consecutive sequence and each valid modulated sampled signal by measuring a cosine of a phase difference between the consecutive sequence and each valid modulated sampled signal.

12. A method for demodulating a modulated signal comprising:
   receiving at least one modulated input waveform;
   determining all possible valid modulated waveforms;
   comparing the received at least one modulated input waveform with the possible valid modulated waveforms;
   determining bit decisions representing a demodulation of the at least one modulated input waveform, each bit decision representing the valid modulated waveform closest to each received at least one modulated input waveform;
   quantizing the at least one modulated input waveform to form quantized sequential signals; and
   concatenating the quantized sequential signals to form a part of an address to a memory.

13. The method according to claim 12, comprising receiving at least one modulated GMSK waveform.

14. The method according to claim 12, comprising storing the bit decisions in the memory, the address being used to access the bit decisions representing a demodulation of the at least one modulated input waveform.

15. A demodulator comprising:

a quantizer, the quantizer receiving an input modulated waveform, the quantizer quantizing the input modulated waveform producing quantized data;

at least one memory device operatively connected to the quantizer, the at least one memory device containing bit decisions representing demodulation of the input modulated waveform, the quantized data being used to form an address to the at least one memory device; and at least one counter operatively connected to the at least one memory device, an output from the at least one counter being used as part of the memory address to access the bit decisions.

16. The demodulator according to claim 15, further comprising at least one buffer, the at least one buffer operatively connected between the quantizer and the at least one memory device, the at least one buffer forming the memory address using the quantized data and sending the memory address to the at least one memory device to obtain the bit decisions.

17. The demodulator according to claim 16, wherein each at least one buffer is a shift register.

18. The demodulator according to claim 15, wherein the at least one memory device is a ROM.

19. The demodulator according to claim 15, wherein the at least one memory device is a RAM.

20. The demodulator according to claim 15, wherein the quantizer is an angle quantizer.

21. The demodulator according to claim 15, wherein the quantizer is a phase quantizer.

22. A method for demodulating a signal comprising:

identifying characteristics of a modulated input waveform;

determining a finite number of values in a nominal constellation representing all possible valid values for the modulated input waveform;

determining an approximate phase constellation of valid values for the modulated input waveform based on the at least one of the location and groupings of the values for the modulated input waveform in the nominal phase constellation, wherein the number of valid values for the modulated input waveform in the approximate phase constellation is less than the number of values for the modulated input waveform in the nominal phase constellation;

determining all possible values for the modulated input waveform with noise;

comparing each possible value for the modulated input waveform with noise with the valid values for the modulated input waveform;

assigning a bit decision representing each valid value for the modulated input waveform closest to each possible value for the modulated input waveform with noise for all possible values for the modulated input waveform with noise;

storing the bit decisions in a memory device;

receiving a set number of consecutive modulated input waveforms with noise;

quantizing each received set number of consecutive modulated input waveforms with noise;

forming a memory address from bits representing each quantized set number of consecutive modulated input waveforms with noise and output from a counter; and outputting the bit decision representing a demodulation of the set number of consecutive modulated input waveforms, the bit decision is outputted from the memory address of the memory device.

* * * * *